Aug. 16, 1927.

H. K. KRANTZ

SWITCH HOUSING

Filed Sept. 23, 1922

1,638,940

WITNESSES:

INVENTOR
Hubert K. Krantz.
BY
ATTORNEY

Patented Aug. 16, 1927.

1,638,940

UNITED STATES PATENT OFFICE.

HUBERT K. KRANTZ, OF WILKINSBURG, PENNSYLVANIA, ASSIGNOR TO WESTINGHOUSE ELECTRIC & MANUFACTURING COMPANY, A CORPORATION OF PENNSYLVANIA.

SWITCH HOUSING.

Application filed September 23, 1922. Serial No. 590,178.

My invention relates to housings for electrical equipment and particularly to housings for enclosing service switches and fuses.

One object of my invention is to provide a switch housing having facilities for connecting conductor conduits thereto and which may readily be removed from the conduits without necessitating drawing the ends of the terminals through the end walls of the housing to which the conduit is attached.

It has been common practice to provide switch housings with end walls having knockout openings for receiving the threaded ends of conductor conduits. The conduit is usually attached to the end wall by means of a collar placed upon the threaded end of the conduit and a bushing threaded upon the extreme end of the conduit within the housing which engages the inner face of the end wall.

Usually, when it is desired to disconnect a switch housing of standard construction from the conduit for the purpose of inspection or repair, it is first necessary to remove the bushing and to move the conduit longitudinally clear of the end wall. Before this is done, however, it is necessary to insulate the exposed live terminals that extend from the conduit, otherwise, a short-circuit is likely to occur by reason of contact of the terminals with the end wall of the housing when the terminals are withdrawn through the knockout openings in the end wall. It is frequently difficult to displace the conduit longitudinally, with the result that considerable difficulty is experienced in removing the housing from between the ends of the conduit.

Another object of my invention is to provide a switch housing with an end wall having an opening or notch extending inwardly from the front edge of the end wall of sufficient size to accommodate one or more conduits and to provide an end plate for closing the opening that is secured to the conduit and which may be displaced laterally of the housing by simply moving the conduit away from the wall, which operation is more easily accomplished than moving the conduit longitudinally, as heretofore practiced.

Another object of my invention is to provide a switch housing, having the above characteristics, that is simple in construction, inexpensive to manufacture and which may be assembled and disassembled with a minimum expenditure of time and effort.

Figure 2:
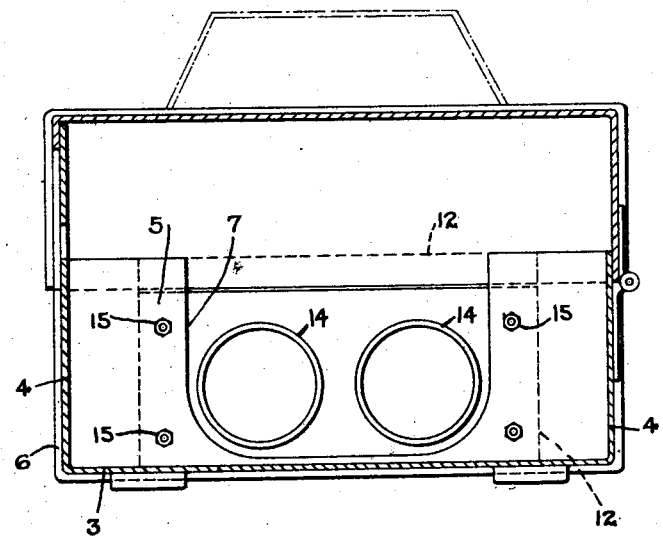
Figure 1:
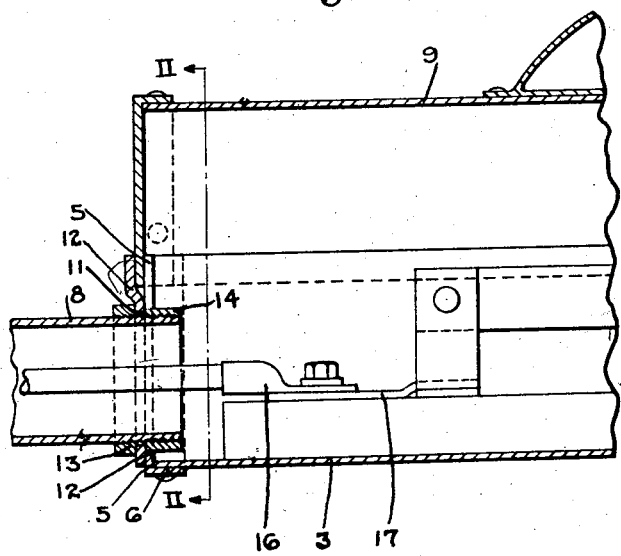

These and other objects, that will be made apparent throughout the further description of my invention, are attained by means of the apparatus hereinafter described, and illustrated in the accompanying drawings, wherein:

Figure 1 is a longitudinal sectional view of one end of a housing embodying features of my invention, and Fig. 2 is a transverse sectional view of the housing shown in Fig. 1, taken on the line II—II of Fig. 1.

Referring to the drawings, the apparatus includes a sheet-metal housing having a bottom wall 3 and side walls 4. It will be understood that both ends of the housing are similar in construction to that illustrated in the drawings. Each end is provided with an end plate 5 having a flange 6 that is adapted to extend over and engage the outer surfaces of the bottom and side walls adjacent their ends. The end plate is provided with an opening or notch 7 that is cut in from the outer edge of the plate for receiving the ends of conductor conduits 8. The housing is provided with a hinged lid or cover 9 that overlaps the front edges of the side walls and end plates, as indicated in the drawings.

The ends of the conduit are threaded and extend through openings 11 (Fig. 1) provided in a closure plate 12 that is secured to the conduit by means of a threaded collar 13 and a threaded bushing 14 that are disposed on opposite sides of the closure plate. The end plate 5 and the closure plate 12 are provided with alined perforations through which fastening bolts 15 extend for securing the closure plate to the end plate in the manner indicated in the drawings.

In order to assemble the housing with respect to the conduit, the housing is first secured in place upon the wall or support. The plate 12 is then secured to the conduit and the latter is then moved toward the support or wall until the perforations in the plates 12 and 5 are in alinement. Bolts 15 are then inserted which serve to hold the housing and conduit in assembled relation.

When it is desired to remove the housing, the terminals 16 are first detached from the switch terminals 17. The bolts 15 are then removed and the conduit is next displaced in a forward direction, carrying the end plate 12 with it. By reason of the construction herein shown, it is unnecessary to draw the live terminals 16 through an opening, as is the usual practice, and, therefore, it is unnecessary to tape the live terminals except as an extra precaution. It is unnecessary to displace the conduit in a longitudinal direction, which is practically an impossible operation in some installations.

It will be noted that the end plate 12 is offset adjacent its outer edge in such manner that it overlaps the outer face of the end of the cover, thus constituting a dust lap in the vicinity of the opening 7. It will be seen, therefore, that the end plate effectually closes the opening 7.

While I have described and illustrated but one embodiment of my invention, it will be apparent to those skilled in the art that various changes, modifications, substitutions, additions and omissions may be made in the apparatus illustrated without departing from the spirit and scope of my invention, as set forth in the appended claim.

I claim as my invention:

The combination with a housing for an electrical device having an end wall provided with an opening extending inwardly from its outer edge, a movable cover and a conduit extending through the opening, of a closure plate secured to and removable with the conduit, and having its outer edge offset for providing a space between the plate and the end wall for receiving a portion of the cover.

In testimony whereof, I have hereunto subscribed my name this 16th day of September, 1922.

HUBERT K. KRANTZ.